UNITED STATES PATENT OFFICE.

LOUIS EMILE AUBERTIN, OF PARIS, FRANCE.

IMPROVEMENT IN PRODUCING CHLORINE.

Specification forming part of Letters Patent No. 134,190, dated December 24, 1872.

*To all whom it may concern:*

Be it known that I, LOUIS EMILE AUBERTIN, of Paris, France, have invented a new and useful Improvement in Producing Chlorine, of which the following is a specification:

This invention relates to a new process for producing chlorine by causing a mixture of air and gaseous or liquid hydrochloric acid to pass over sesquioxide of chrome, heated, by preference, to a temperature of about 600° Fahrenheit.

When combined with oxide of chrome the oxygen of the air unites with the hydrogen of the hydrochloric acid, producing water and liberating the chlorine.

In place of the sesquioxide of chrome, the ore of chromium may be used in its natural state, or the minerals known by the names of chromochre, chromite, sidero, chrome, &c., may be employed, or the alkaline or metallic chromates or chromites, &c. It will be noticed, however, that should these various substitutes act at first as oxidizing bodies, by letting out part of their oxygen, they reach very rapidly the state of sesquioxide, and will then continue acting as such. For example, in carrying out my invention I arrange in a furnace sets of pipes which may be of cast-iron or pottery or of cast-iron lined with clay or porcelain on the inside. The pipes are to be filled with the chrome compound which has been selected, care being had, however, to have them so filled that the gases may go through them without too much pressure.

Good results are obtained with pumice-stone charged with bichromate of potash. The temperature is raised to about 570° Fahrenheit, and a mixture of gaseous hydrochloric acid and air is caused to pass through the pipes in the proportion of about four parts of the gaseous hydrochloric acid to five parts of air. The volume of the latter may be increased without any hesitation, or even reduced. The gases may be forced through by a blower, pump, by exhaustion, or other means.

The gases issuing from the pipes are a compound of chlorine, azote, and air in excess, and also some hydrochloric acid undecomposed. These gases can be mixed with steam and used directly for preparing liquid hypochlorites. In order to obtain the same salts in the dry state the steam should be condensed previous to bringing the gases in contact with the base.

I beg leave to disclaim as my invention "the continuous production of chlorine by passing a current of hydrochloric-acid gas and atmospheric air over heated compounds, which, or one of the elements of which, must have the power of absorbing oxygen and decomposing acids."

Claim.

Having thus described my invention, I claim as new and desire to secure by Letters Patent—

Producing chlorine through the action of the oxygen of the air, pure oxygen gas, or other oxidizing agents on hydrochloric acid in the presence of a chrome compound or sesquioxide, substantially as specified.

LOUIS EMILE AUBERTIN.

Witnesses:
ADOLPHE EUGÈNE GUION,
CHARLES D. CHRIS.